US010399560B2

(12) United States Patent
Schmitt

(10) Patent No.: US 10,399,560 B2
(45) Date of Patent: Sep. 3, 2019

(54) METHOD FOR DETERMINING A CHARACTERISTIC CURVE OF A HYBRID SEPARATING CLUTCH OF A HYBRID VEHICLE WITHOUT A TEST STAND

(71) Applicant: Schaeffler Technologies AG & Co. KG, Herzogenaurach (DE)

(72) Inventor: Werner Schmitt, Sinzheim (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 11 days.

(21) Appl. No.: 15/539,895

(22) PCT Filed: Jan. 20, 2016

(86) PCT No.: PCT/DE2016/200021
§ 371 (c)(1),
(2) Date: Jun. 26, 2017

(87) PCT Pub. No.: WO2016/124181
PCT Pub. Date: Aug. 11, 2016

(65) Prior Publication Data
US 2018/0001886 A1    Jan. 4, 2018

(30) Foreign Application Priority Data
Feb. 4, 2015   (DE) .......................... 10 2015 201 933

(51) Int. Cl.
*B60W 20/40*     (2016.01)
*F16D 48/06*     (2006.01)
(Continued)

(52) U.S. Cl.
CPC .............. *B60W 20/40* (2013.01); *B60K 6/387* (2013.01); *B60W 10/02* (2013.01); *B60W 10/06* (2013.01);
(Continued)

(58) Field of Classification Search
CPC ................ Y10T 477/26; B60W 10/08; B60W 2510/0275; B60W 2510/0657;
(Continued)

(56) References Cited

U.S. PATENT DOCUMENTS 8,392,083 B2    3/2013  Hodrus et al.
8,961,364 B2 *  2/2015  Nefcy .................... F16D 48/02
                                                    477/175
(Continued)

FOREIGN PATENT DOCUMENTS

DE    102008030473    1/2009
DE    102008001140    10/2009
(Continued)

*Primary Examiner* — Roger L Pang
(74) *Attorney, Agent, or Firm* — Volpe and Koenig, P.C.

(57) ABSTRACT

The invention relates to a method for determining a characteristic curve of a hybrid separating clutch of a hybrid vehicle without a test stand, wherein the hybrid separating clutch separates or connects an internal combustion engine and an electric motor and the hybrid separating clutch is slowly actuated on the basis of a position which the hybrid separating clutch assumes in an unactuated state, and a clutch characteristic curve is determined as a function of a clutch torque over a path of the hybrid separating clutch. In a method by which a characteristic curve of the hybrid separating clutch can be reliably defined without a test stand, a clutch torque which underlies the characteristic curve of the hybrid separating clutch is determined from the torque of the internal combustion engine in the case of a running internal combustion engine and a motion state of the electric motor which brakes the internal combustion engine while the hybrid separating clutch is moving.

7 Claims, 1 Drawing Sheet

(51) Int. Cl.
*B60K 6/387* (2007.10)
*B60W 10/02* (2006.01)
*B60W 10/06* (2006.01)
*B60W 10/196* (2012.01)
*B60W 10/08* (2006.01)

(52) U.S. Cl.
CPC ........... *B60W 10/196* (2013.01); *F16D 48/06* (2013.01); *B60W 10/08* (2013.01); *B60W 2510/0275* (2013.01); *B60W 2510/0657* (2013.01); *B60W 2710/027* (2013.01); *B60W 2710/065* (2013.01); *B60W 2710/0666* (2013.01); *B60Y 2200/92* (2013.01); *B60Y 2300/42* (2013.01); *B60Y 2300/43* (2013.01); *B60Y 2300/44* (2013.01); *B60Y 2300/60* (2013.01); *F16D 2500/106* (2013.01); *F16D 2500/1066* (2013.01); *F16D 2500/10412* (2013.01); *F16D 2500/1107* (2013.01); *F16D 2500/3065* (2013.01); *F16D 2500/30412* (2013.01); *F16D 2500/30421* (2013.01); *F16D 2500/50236* (2013.01); *F16D 2500/50251* (2013.01); *F16D 2500/50281* (2013.01); *F16D 2500/70252* (2013.01); *F16D 2500/70264* (2013.01); *F16D 2500/70605* (2013.01); *Y10T 477/26* (2015.01)

(58) Field of Classification Search
CPC ........... B60W 2710/027; B60W 20/40; B60W 10/02; B60W 10/06; B60K 6/387; F16D 48/06; F16D 2500/50236; F16D 2500/106; F16D 2500/1107; F16D 2500/10412; F16D 2500/70605; F16D 2500/70264; F16D 2500/50281; F16D 2500/50251; F16D 2500/3065; F16D 2500/30421; F16D 2500/30412; F16D 2500/1066; F16D 2500/70252
USPC .......................................................... 701/68
See application file for complete search history.

(56) References Cited

U.S. PATENT DOCUMENTS

| | | | | |
|---|---|---|---|---|
| 9,233,684 | B2* | 1/2016 | Park | F16H 61/061 |
| 2009/0255743 | A1 | 10/2009 | Dilzer et al. | |
| 2010/0004837 | A1 | 1/2010 | Connolly et al. | |
| 2010/0279818 | A1 | 11/2010 | Soliman et al. | |
| 2011/0130911 | A1 | 6/2011 | Allgaier et al. | |
| 2016/0375889 | A1* | 12/2016 | Kim | B60W 20/00 701/22 |
| 2017/0343064 | A1* | 11/2017 | Lienhard | F16D 48/06 |
| 2018/0172090 | A1* | 6/2018 | Kim | F16D 48/06 |

FOREIGN PATENT DOCUMENTS

| | | |
|---|---|---|
| DE | 102008040662 | 1/2010 |
| DE | 102010024941 | 1/2011 |
| DE | 102010023505 | 12/2011 |
| DE | 102013103878 | 10/2014 |
| WO | 2008064633 | 6/2008 |

* cited by examiner

METHOD FOR DETERMINING A CHARACTERISTIC CURVE OF A HYBRID SEPARATING CLUTCH OF A HYBRID VEHICLE WITHOUT A TEST STAND

BACKGROUND

The invention relates to a method for the determination of a characteristic curve of a hybrid separating clutch of a hybrid vehicle without a test stand, with the hybrid separating clutch connecting or disconnecting an internal combustion engine and an electric motor, and the hybrid separating clutch, starting from a position at which it assumes an unactuated state, being slowly actuated and the clutch characteristic curve being determined as a function of the clutch torque over a path of the clutch separating clutch.

DE 10 2010 024 941 A1 discloses a method for controlling a duplex clutch transmission with at least two partial drivetrains, allowing each of them to be coupled via a clutch to an internal combustion engine. During drive operation of the vehicle comprising the duplex clutch transmission a bite point of the clutch is determined independent from the engine torque. This bite point is an essential support point for a clutch characteristic curve, which states the clutch torque transmitted at a predetermined path traveled by the clutch. This bite point is determined during the startup routine of the vehicle and is then adapted during operation of the vehicle in order to adjust the clutch characteristic curve.

In a hybrid vehicle with a hybrid drivetrain the drive resistance can be overcome by two independent energy sources, such as fuel of an internal combustion engine and electric energy from a traction battery of an electric motor by converting them into mechanic energy. A method is known from DE 10 2008 030 473 A1 for the determination of the bite point of an automatic hybrid separating clutch. The bite point of the hybrid separating clutch arranged between an internal combustion engine and an electric traction drive is determined when the internal combustion engine is stationary by slowly closing the hybrid separating clutch and evaluating the influence of the slowly closing hybrid separating clutch upon the electric machine of the electric traction drive rotating with a predetermined speed.

The clutch characteristic curve of the hybrid separating clutch must be determined for proper operation. For this purpose the clutch is closed until reaching a torque specific for the respective application and the characteristic curve of the clutch torque is determined over the path. This is usually performed on a test stand. In particular in mechanic shops, due to the lack of such a test stand, the clutch characteristic curve cannot be learned for newly installed hybrid separating clutches.

SUMMARY

The invention is based on the objective to provide a method by which the clutch characteristic curve of the hybrid separating clutch can also be reliably learned without the availability of a test stand.

According to the invention the objective is attained in that, with the internal combustion engine running and a motion status of the electric motor that brakes the internal combustion engine while the hybrid separating clutch is moving, a clutch torque is determined from the torque of the internal combustion engine underlying the characteristic curve of the hybrid separating clutch. This is advantageous in that at any time this clutch characteristic curve of the hybrid separating clutch can also be determined at the vehicle without any test stand.

Advantageously the internal combustion engine is kept at a predetermined speed using control measures, with the torque of the internal combustion engine being increased by the braking effect of the electric motor and the difference of the torque under the influence of the braking electric motor and the torque without the effect of the electric motor being equivalent to the clutch torque of the hybrid separating clutch. Due to the fact that a linear connection is given between the change in torque of the internal combustion engine and the torque applied by the hybrid separating clutch, here the clutch characteristic curve of the hybrid separating clutch can be reliably detected.

In one embodiment a second clutch of the transmission, connected to the electric motor, which drives the drive wheels is closed for blocking the electric motor and subsequently the hybrid separating clutch is moved out of the opened state into a closed one, with the torque of the internal combustion engine being evaluated. The electric motor is blocked by the fixed connection of the electric motor to the transmission. Due to the fact that the electric motor is not moving, the torque applied by the internal combustion engine is equivalent to the clutch torque of the hybrid separating clutch.

In one variant, before the second clutch is closed, a gear is engaged in the transmission and/or the hybrid vehicle is blocked with a brake. This way a rotary motion of the electric motor is reliably prevented, which motor is connected fixed via the second clutch to the drivetrain.

In a further development, with the second clutch being open, the electric motor is operated in a direction opposite the one of the internal combustion engine and the hybrid separating clutch is moved out of the opened state into the closed state, with the clutch characteristic curve of the hybrid separating clutch being determined as a function of the torque of the internal combustion engine. This procedure is particularly advantageous when the starting torque of the internal combustion engine is lower than the bite torque of the hybrid separating clutch. Here and in the following the bite torque shall be understood as the clutch torque of the hybrid separating clutch at which the hybrid separating clutch starts to transfer torque between the internal combustion engine and the electric motor.

In this method the idling speed of the internal combustion engine is increased in order to prevent that the internal combustion engine is choked as the method is carried out.

In one embodiment a saved default characteristic curve is adjusted to the clutch characteristic curve deducted from the torque of the internal combustion engine. Due to the fact that the general progression of the hybrid separating clutch in the default characteristic curve is known, during the determination of the characteristic curve of the hybrid separating clutch primarily supporting points are determined which lead to an adjustment of the default characteristic curve. Such a supporting point is primarily the bite point by which the default characteristic curve is displaced over the path of the hybrid separating clutch during the adaptation.

A further development of the invention relates to a method for the determination of a characteristic curve of the hybrid separating clutch of a hybrid vehicle without a test stand, with the hybrid separating clutch connecting or disconnecting an internal combustion engine and an electric motor and the hybrid separating clutch, starting from a position which it assumes in an unactuated stated, slowly being actuated and a clutch characteristic line being determined as a function of a clutch torque over the path of a hybrid separating clutch. In this method, with the second clutch being open and the internal combustion engine being switched off, the hybrid separating clutch is slowly moved out of an open state into a closed state and the characteristic curve is determined up to a starting torque of the internal combustion engine. This process is recommended when the starting torque of the internal combustion engine is greater than a bite torque of the hybrid separating clutch.

BRIEF DESCRIPTION OF THE DRAWINGS

The invention allows numerous embodiments. One of them shall be explained in greater detail based on the FIGURE shown in the drawing.

Shown is.

DETAILED DESCRIPTION OF THE PREFERRED EMBODIMENTS

Figure 1:
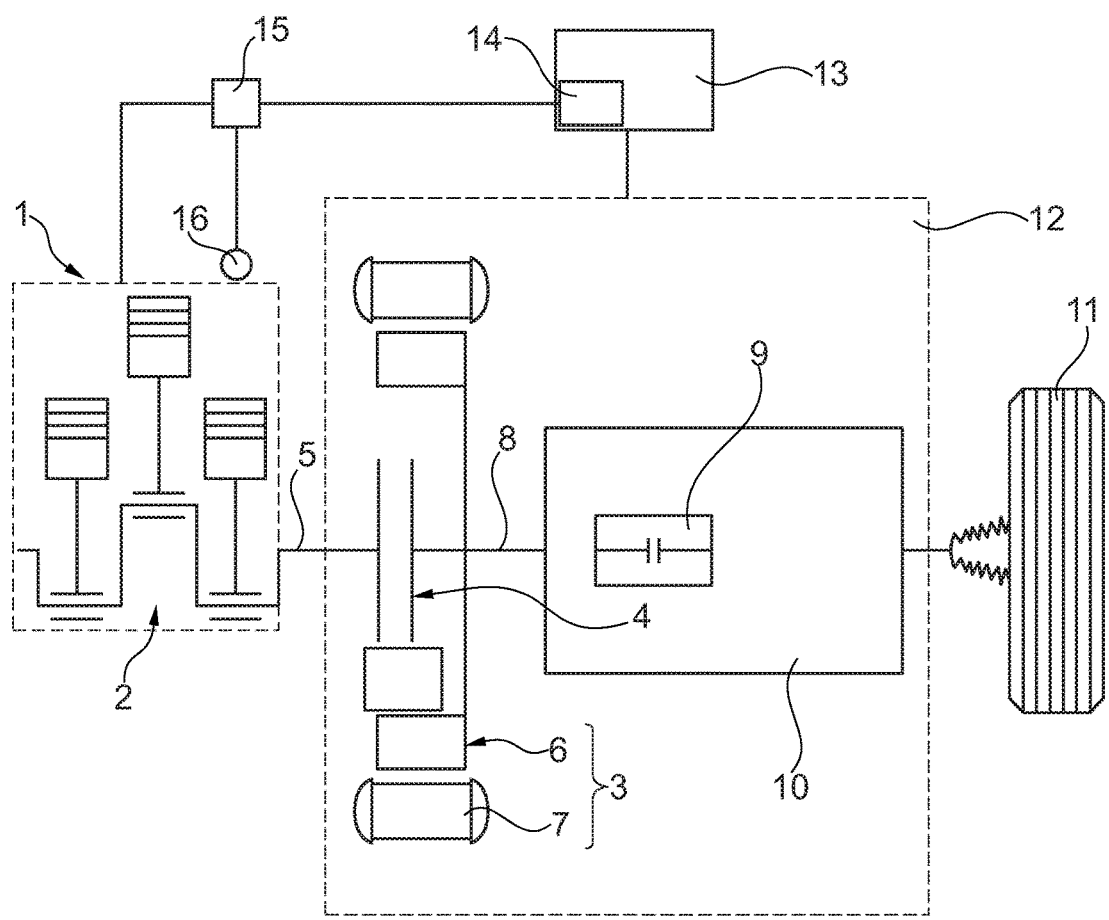
FIG. 1: an illustration of the principle of a hybrid drive of a hybrid vehicle.

FIG. 1 shows an illustration of the principle of a drivetrain of a hybrid vehicle. This drivetrain 1 comprises an internal combustion engine 2 and an electric motor 3. A hybrid separating clutch 4 is arranged between the internal combustion engine 2 and an electric motor 3, directly downstream of the internal combustion engine 2. The internal combustion engine 2 and the hybrid separating clutch 4 are connected to each other via a crankshaft 5. The electric motor 3 comprises a rotational rotor 6 and a fixed stator 7. The driven shaft 8 of the hybrid separating clutch is connected to a transmission 10, which comprises a second clutch 9, arranged between the electric motor 3 and the transmission 10. The transmission 10 transfers the torque generated by the internal combustion engine 2 and/or the electric motor 3 to the drive wheels 11 of the hybrid vehicle. The hybrid separating clutch 4 and the transmission 10 form here a transmission system 12, which is controlled by a hydrostatic clutch actuator 13 used in combination with the hybrid separating clutch 4, which is closed in the unactuated state. The hybrid separating clutch 4 is actuated by the hydrostatic clutch actuator 13 over a hydrostatic path. Here, the path traveled by the clutch actuator 13 is proportional to the path of the hybrid separating clutch 4.

The hydrostatic clutch actuator 13 comprises a control device 14, which is connected to an idling controller 15 of the internal combustion engine, leading to a first speed sensor 16 detecting the speed of the internal combustion engine 2.

In order to learn the clutch characteristic curve of the hybrid separating clutch 4 when starting the operation of the transmission system 11 without here requiring a test stand, in a first embodiment the second clutch 9 is closed in the transmission 10. Before closing the clutch 9 a gear is engaged in the transmission 10 and the hybrid vehicle is blocked by a brake, which may be embodied as a handbrake and/or a footbrake. The electric motor 3 cannot rotate due to the direct coupling to the second clutch 9. Starting with this state the hybrid separating clutch 4 is opened, allowing the internal combustion engine 2 to rotate. The learning of the clutch characteristic curve of the hybrid separating clutch 4 occurs now by slowly closing the hybrid separating clutch 4 and observing the torque of the internal combustion engine 2. Here, in every position of the hybrid separating clutch 4 adjusted by the movement of the hydrostatic clutch actuator 13 the torque difference of the internal combustion engine 2 is detected.

With the hybrid separating clutch 4 being open, the internal combustion engine 2 moves with a predetermined torque and shows an idling speed which is detected by the speed sensor 16. When now the hybrid separating clutch 4 is closed the internal combustion engine 2 is braked by the immobility of the electric motor 3. The idling controller 15 increases the torque of the internal combustion engine 2 in order to keep constant the idling speed of the internal combustion engine 2. Here a difference of the torque of the internal combustion engine 2 results from the torque with the influencing electric motor 3 and the torque being influential, which the internal combustion engine 2 shows in the idling state without the impact of the electric motor 3. This difference is directly proportional to the clutch torque of a predetermined path traveled by the hybrid separating clutch 4. This way, from various positions of the hybrid separating clutch 4 and the torque differences of the internal combustion engine 2 determined therefor, a clutch characteristic curve can be determined as a function of the clutch torque over the path of the clutch actuator 13 and/or the hybrid separating clutch 4.

Usually a default characteristic curve is saved in the control device 14 of the transmission system 11, which is adjusted based on the actually measured clutch characteristic curve. The default characteristic curve represents a characteristic curve of the hybrid separating clutch 4 which is allocated without any correction to the hybrid separating clutch 4. By the actual clutch characteristic curve determined from the changing torque of the internal combustion engine 2, here structural features are considered of the actually given hybrid separating clutch 4 and the transmission system 12.

Another exemplary embodiment for learning the characteristic curve of the hybrid separating clutch 4 comprises that the hybrid separating clutch 4 and the second clutch 9 are opened and the internal combustion engine 2 is turned off. Due to the opened second clutch 9 the electric motor 3 can rotate freely. When now the hybrid separating clutch 4 is slowly closed the characteristic curve of the hybrid separating clutch 4 can be determined at least until the starting torque of the internal combustion engine 4. If this is insufficient, in a third exemplary embodiment in which the above-stated situation of opening the hybrid separating clutch 4 and opening the second clutch 9 is maintained, the internal combustion engine 2 can rotate. The electric motor 3 also rotates, however in a direction opposite the direction of rotation of the internal combustion engine 2. Due to this opposite direction of rotation of the electric motor 3 it has a braking effect upon the torque of the internal combustion engine 2. If now the hybrid separating clutch 4 is slowly closed, due to the braking effect of the electric motor 3, a much stronger torque can be transferred from the electric motor 3 via the hybrid separating clutch 4 to the internal combustion engine 2, which in turn via an idling controller 15 is adjusted to its original speed, increasing the torque. This way, from this speed difference described above the clutch torque of the hybrid separating clutch 4 can be determined at different positions of the hybrid separating clutch 4. The idling speed can be increased in order to prevent that the internal combustion engine is choked.

So far, the invention has only been described in consideration of a second clutch embodied as a single clutch in the transmission system 12. However, it is also possible to use a duplex clutch instead of a single clutch, with then respectively one clutch of the duplex clutch assuming the state described for the second clutch.

Based on the method described the clutch characteristic curve of a hybrid separating clutch 4 can also be determined without a test stand being available during the startup routine of a transmission system 2.

LIST OF REFERENCE CHARACTERS

1 Drivetrain
2 Internal combustion engine
3 Electric motor
4 Hybrid separating clutch
5 Crankshaft
6 Rotor
7 Stator
8 Driven shaft
9 Clutch
10 Transmission
11 Drive wheels
12 Transmission system
13 Hydrostatic clutch actuator
14 Control device
15 Idling controller
16 Speed sensor

The invention claimed is:

1. A method for determination of a characteristic curve of a hybrid separating clutch of a hybrid vehicle without a test stand, with the hybrid separating clutch connecting or disconnecting an internal combustion engine and an electric motor, the method comprising:
actuating the hybrid separating clutch, starting from a position assumed thereby in an unactuated state, and determining a clutch characteristic curve as a function of a clutch torque over a path of the hybrid separating clutch, and with the internal combustion engine running and an operating state of the electric motor that brakes the internal combustion engine with the hybrid separating clutch moving, determining a clutch torque from a torque of the internal combustion engine underlying the clutch characteristic curve of the hybrid separating clutch while operating the electric motor in a rotational direction opposite from a rotational direction of the internal combustion engine.

2. The method according to claim 1, further comprising: keeping the internal combustion engine at a predetermined idling speed by control measures, and increasing the torque of the internal combustion engine by a braking effect of the electric motor and determining the clutch torque by a difference of the torque under an influence of the braking electric motor and the torque without the influence of the electric motor.

3. The method according to claim 1, further comprising: closing a second clutch of a transmission, connected to the electric motor and driving drive wheels to block the electric motor and subsequently moving the hybrid separating clutch from an opened state into a closed one, with the torque of the internal combustion engine being evaluated.

4. The method according to claim 3, further comprising: before closing the second clutch, at least one of engaging a gear or blocking the hybrid vehicle with a brake.

5. The method according to claim 1, further comprising: adjusting a saved default characteristic curve to the clutch characteristic curve deducted from an actually given torque of the internal combustion engine.

6. A method for determination of a characteristic curve of a hybrid separating clutch of a hybrid vehicle without a test stand, with the hybrid separating clutch connecting or disconnecting an internal combustion engine and an electric motor, the method comprising:
actuating the hybrid separating clutch, starting from a position assumed thereby in an unactuated state, and determining a clutch characteristic curve as a function of a clutch torque over a path of the hybrid separating clutch,
with the internal combustion engine running and an operating state of the electric motor that brakes the internal combustion engine with the hybrid separating clutch moving, determining a clutch torque from a torque of the internal combustion engine underlying the clutch characteristic curve of the hybrid separating clutch, and
with an opened second clutch, operating the electric motor in a direction of rotation opposite from a rotational direction of the internal combustion engine and moving the hybrid separating clutch from an opened state into a closed state, with the clutch characteristic curve of the hybrid separating clutch being determined as a function of the torque of the internal combustion engine.

7. The method according to claim 6, further comprising: increasing an idling speed of the internal combustion engine.

* * * * *